(12) United States Patent
Suh et al.

(10) Patent No.: US 7,929,445 B2
(45) Date of Patent: Apr. 19, 2011

(54) APPARATUS AND METHOD FOR DETERMINING DATA TRANSMISSION RATE IN MULTI-HOP RELAY SYSTEM

(75) Inventors: Kyung-Joo Suh, Seoul (KR); Jae-Hee Cho, Seoul (KR); Ki-Young Han, Yongin-si (KR); Dong-Ho Cho, Seoul (KR); Chi-Sung Bae, Andong-si (KR); Soo-Yong Jeon, Daejeon (KR); Sang-Wook Kwon, Daegu (KR); Ji-Hyun Park, Seoul (KR)

(73) Assignees: Samsung Electronics Co., Ltd (KR); Korea Advanced Institute of Science and Technology (KR)

( * ) Notice: Subject to any disclaimer, the term of this patent is extended or adjusted under 35 U.S.C. 154(b) by 1012 days.

(21) Appl. No.: 11/803,134

(22) Filed: May 11, 2007

(65) Prior Publication Data

US 2007/0264932 A1 Nov. 15, 2007

(30) Foreign Application Priority Data

May 12, 2006 (KR) .................. 10-2006-0042742

(51) Int. Cl.
*H04L 1/00* (2006.01)
(52) U.S. Cl. ......... 370/235; 370/229; 370/230; 370/232
(58) Field of Classification Search .......... 370/229–238, 370/277–282, 293–295, 315–326, 328–333, 370/492, 501; 455/7, 11.1, 115.1–115.4, 455/226.1–226.4, 272, 227.1, 227.2
See application file for complete search history.

(56) References Cited

U.S. PATENT DOCUMENTS

| 6,965,568 B1 * | 11/2005 | Larsen | 370/238 |
| 2004/0215809 A1 * | 10/2004 | Kim et al. | 709/232 |
| 2005/0124369 A1 * | 6/2005 | Attar et al. | 455/522 |
| 2006/0211378 A1 * | 9/2006 | Gaal et al. | 455/69 |

FOREIGN PATENT DOCUMENTS

| KR | 1020040063074 | 7/2004 |
| KR | 1020050108509 | 11/2005 |

* cited by examiner

*Primary Examiner* — Kamran Afshar
*Assistant Examiner* — Neda Behrooz
(74) *Attorney, Agent, or Firm* — The Farrell Law Firm, P.C.

(57) ABSTRACT

Provided is an apparatus and method for determining a data transmission rate in consideration of the queue length of a Relay Station RS in a multi-hop relay system. A Base Station BS apparatus of the multi-hop relay system includes a receiver and a calculator. The receiver receives channel condition information and queue length information for a Mobile Station MS from an RS. The calculator of the BS apparatus determines a data transmission rate between the BS and the RS for data of the MS using the channel condition information and the queue length information.

16 Claims, 10 Drawing Sheets

APPARATUS AND METHOD FOR DETERMINING DATA TRANSMISSION RATE IN MULTI-HOP RELAY SYSTEM

PRIORITY

This application claims priority under 35 U.S.C. §119 to an application filed in the Korean Intellectual Property Office on May 12, 2006 and allocated Serial No. 2006-42742, the contents of which are incorporated herein by reference.

BACKGROUND OF THE INVENTION

1. Field of the Invention

The present invention relates generally to an apparatus and method for determining a data transmission rate in a multi-hop relay system, and more particularly, to an apparatus and method for determining a data transmission rate in consideration of the queue length of a relay station in a multi-hop relay system.

2. Description of the Related Art

The development of a new fourth-generation (4G) mobile communication system is taking place to expand service coverage and provide a higher data transmission rate than in the third-generation (3G) mobile communication system. Many institutes and enterprises in advanced countries are already promoting competitive technology development for the upcoming 4G standardization.

The 4G mobile communication system operating in a high frequency band has a restricted data transmission rate and service coverage due to a high path loss. Recently, a multi-hop relay scheme has been researched to solve the above problem of the 4G mobile communication system. The multi-hop relay scheme uses one or more Relay Stations (RSs) to relay data and transmit a signal from a Base Station (BS) even to a Mobile Station (MS) remote from the BS, thereby making it possible to reduce a path loss, provide high-speed data transmission and expand service coverage.

In a single-hop system, because radio data transmission is performed only between a BS and an MS, the BS uses the Channel Quality Information (CQI) of the MS to determine a Modulation and Coding Scheme (MCS) level and thus a data transmission rate. However, in a multi-hop system, because a BS must manage not only data transmission between the BS and an MS but also data transmission between the BS and an RS, the BS must control a data transmission rate between the BS and the RS in consideration of all of the above data transmissions.

In a conventional single-hop system, because radio data transmission is performed only between a BS and an MS, communication can be performed within one frame when the BS transmits/receives data to/from the MS. Therefore, using the CQI report value of the MS for the previous frame, the BS allocates radio resources for the next frame and determines an MCS level. However, in a conventional multi-hop system, because several radio links exist, resource allocation and data rate determination must be performed on each of the radio links.

FIG. 1 illustrates the structure of a conventional multi-hop relay system.

Referring to FIG. 1, a Mobile Station MS1, which is located inside the service coverage of a BS, is connected through a direct link to the BS, while an MS2, which is located outside the service coverage of the BS and thus is incapable of communicating directly with the BS, is connected through an RS to the BS. That is, the RS is located between the BS and the MS2 to relay data from the BS to the MS2. A frame communicated between the BS and the RS will be referred to as a "frame A", while a frame communicated between the RS and the MS2 (or MS1 in other Figures herein, when stated) will be referred to as a "frame B".

A description will now be given of a process for allocating radio resources in such a 2-hop relay system on the basis of CQI information fed back from an MS. In a multi-hop system, because a BS transmits control information and data (traffic) to an RS and the RS relays the same to an MS, a BS-RS communication link between the BS and the RS and an RS-MS communication link between the RS and the MS must be distinguished from each other. For example, the BS-RS communication link and the RS-MS communication link must be distinguished from each other by dividing one frame into subframes or by defining two different frames.

The following description will be given assuming that the BS-RS communication link and the RS-MS communication link are distinguished from each other using different frames, as illustrated in FIG. 1.

A BS-RS radio link is provided with a Line Of Sight (LOS) connection and thus can provide more stable and rapid radio communication than a BS-MS radio link and an RS-MS radio link. Therefore, for BS-RS data communication, congestion does not occur and thus resource allocation and data rate determination can be performed in consideration of only RS-MS channel conditions. However, in the 2-hop relay system, a 2-frame (i.e., frame B and frame A) delay basically occurs because two hops are performed to transmit the CQI information of the MS to the BS, and a 1-frame (i.e., frame A) delay additionally occurs while the BS transmits data to the RS according to schedule based on the received CQI information.

Therefore, an MCS level and allocated resources used for transmission from the RS to the MS are determined based on the 3-frame previous CQI information. When the current channel condition is different from the 3-frame previous channel condition, the RS-MS data transmission efficiency degrades and a transmission failure frequently occurs. At this point, a feedback message ACKnowledgement/NonACKnowledgement (ACK/NACK) for informing a failure in the RS-MS transmission is transmitted to the BS through two hops. In this case, the BS has no choice but to transmit the next data to the RS without knowing the success/failure of the transmission of the previous data. That is, the BS continues to transmit data to the RS without detecting the success/failure of the transmission of the previous data, which causes data to be excessively loaded on the RS. When the RS buffers data excessively as described above, MSs serviced by the RS undergo an additional delay and jitter due to a change in the queue length of the RS.

There is an alternative method in which the BS simply forwards data, destined for the MS, to the RS without determining a data transmission rate based on the feedback information (CQI). However, the alternative method has the following problems.

FIG. 2 illustrates a handover between RSs in a conventional multi-hop relay system.

Referring to FIG. 2, when the BS simply forwards data, destined for the MS2, to an RS1 covering MS2 by using a frame A, the RS1 must buffer all of data for MSs serviced by RS1. At this point, when MS2 is handed over from the serving RS1 to a target RS2, the previous data buffered by the serving RS1 becomes useless and thus the BS must retransmit the data, which was transmitted to the serving RS1, to the target RS2 by using a frame A. This leads to a waste of a BS-RS Transmission (TX) frame (i.e., a frame A), causing the degradation of the overall system performance. When a resource waste occurs as described above, the resource allocation for an MS1 communicating directly with the BS is delayed to delay the communication service for MS1. These problems become more serious as the number of the radio hops increases above 2.

SUMMARY OF THE INVENTION

An object of the present invention is to substantially solve at least the above problems and/or disadvantages and to provide at least the advantages below. Accordingly, an object of the present invention is to provide an apparatus and method for controlling the amount of data loaded on a buffer of an RS in a multi-hop relay system.

Another object of the present invention is to provide an apparatus and method for determining a data transmission rate in consideration of the queue length of an RS in a multi-hop relay system.

According to an aspect of the present invention, a BS apparatus in a multi-hop relay system includes a receiver for receiving channel condition information and queue length information for an MS from an RS, and a calculator for determining a data transmission rate between the BS and the RS for data of the MS using the channel condition information and the queue length information.

According to an aspect of the present invention, an RS apparatus in a multi-hop relay system includes a channel condition information collector for collecting channel condition information fed back from MSs, a queue length information collector for collecting queue length information of queues for buffering data to be relayed to the MSs, and a feedback unit for feeding the channel condition information from the channel condition information collector and the queue length information from the queue length information collector back to a BS.

According to an aspect of the present invention, a communication method for a BS in a multi-hop relay system includes receiving channel condition information and queue length information for an MS from an RS, and calculating a data transmission rate between the BS and the RS for data of the MS using the channel condition information and the queue length information.

According to an aspect of the present invention, a communication method for an RS in a multi-hop relay system includes collecting channel condition information fed back from MSs, collecting queue length information of queues for buffering data to be relayed to the MSs, and reporting the collected channel condition information and the collected queue length information to a BS.

BRIEF DESCRIPTION OF THE DRAWINGS

The above and other objects, features and advantages of the present invention will become more apparent from the following detailed description when taken in conjunction with the accompanying drawings in which.

DETAILED DESCRIPTION OF THE PREFERRED EMBODIMENTS

Preferred embodiments of the present invention will be described herein below with reference to the accompanying drawings. In the following description, well-known functions or constructions are not described in detail for the sake of clarity and conciseness. In addition, the terms used herein are defined according to the functions of the present invention. Thus, the terms may vary depending on user's or operator's intention and usage. Therefore, the terms used herein must be understood based on the descriptions made herein.

Hereinafter, a description will be given of a scheme for controlling the queue length of an RS (or the amount of data loaded on a buffer of an RS) to converge on a target queue length in a multi-hop relay system according to the present invention.

Figure 1:
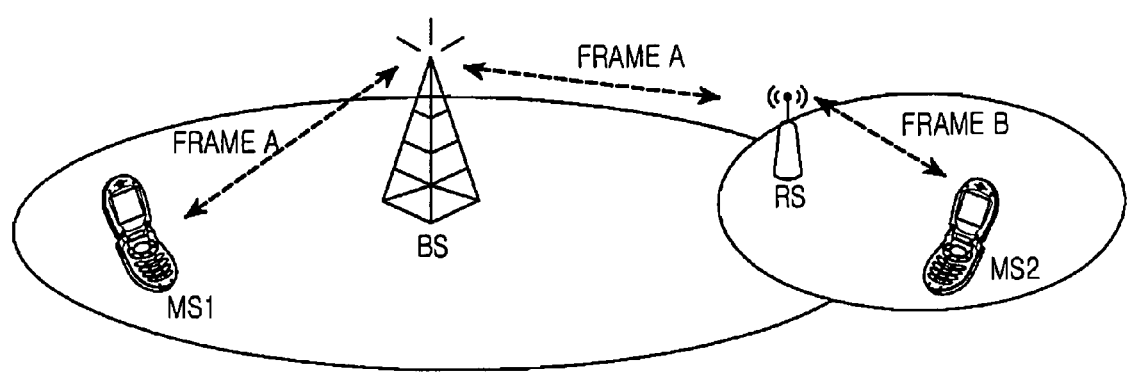
FIG. 1 illustrates the structure of a conventional multi-hop relay system.
Figure 2:
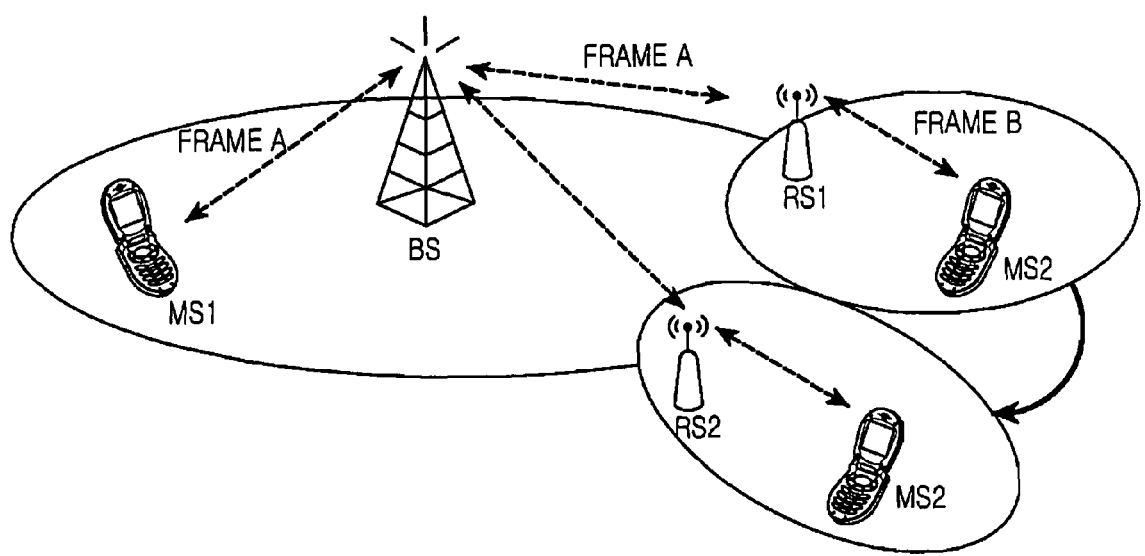
FIG. 2 illustrates a handover between RSs in a conventional multi-hop relay system.
Figure 3:
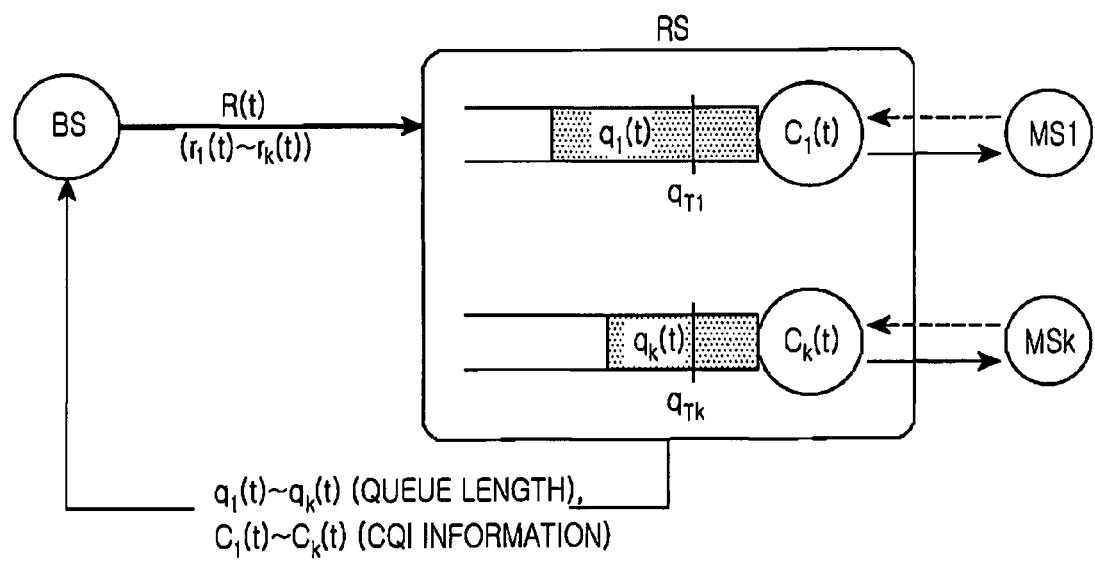
FIG. 3 illustrates a closed data rate control model for a 2-hop relay system according to the present invention.

FIG. 3 illustrates a closed data rate control model for a 2-hop relay system according to the present invention.

Parameters used in the model are defined as follows:

k: the number of MSs serviced by an RS.

$r_i(t)$: a BS-RS data transmission rate for the $i^{th}$ MS at a time point t.

R(t): the total BS-RS data transmission rate $$\left(\sum_{i=0}^{k} r_i(t)\right)$$

at the time point t.

$q_i(t)$: the RS queue length for the $i^{th}$ MS at the time point t.

$C_i(t)$: the channel capacity ($C_i$=BW $\log_2(1+SINR_i)$ or CQI information) between the RS and the $i^{th}$ MS at the time point t.

$q_{Ti}$: the target RS queue length for the $i^{th}$ MS.

Referring to FIG. 3, the RS has k queues to provide services for k MSs MS1~MSk. The RS transmits queue length information $q_1(t)$~$q_k(t)$ and channel condition information $C_1(t)$~$C_k(t)$, fed back from the MSs, to the BS. Then, the BS determines a data transmission rate of each of the MSs using the channel condition information and the queue length information.

For example, it will be assumed that two MSs MS1 and MS2 are serviced by the RS and the RS queue lengths of the MS1 and the MS2 are respectively 5 and 10 (units). The MS1 and MS2 respectively feed back channel condition information 3 and 8 (units) to the RS, and the RS relays the channel condition information ($C_1(t)$=3, $C_2(t)$=8) and the queue length information ($q_1(t)$=5, $q_2(t)$=10) to the BS. Then, the BS determines a BS-RS data transmission rate $r_1(t)$ for the MS1 using the queue length information $q_1(t)$=5 and the channel condition information $C_1(t)$=3 and determines a BS-RS data transmission rate $r_2(t)$ for the MS2 using the queue length information $q_2(t)=10$ and the channel condition information $C_2(t)=8$. Thus, the total data transmission rate between the BS and the RS is $R(t)=r_1(t)+r_2(t)$.

In general, the channel capacity is calculated from the channel condition information (CQI information). Thus, the terms "CQI" and "channel capacity" will be used interchangeably herein.

In the above embodiment, the BS determines a data transmission rate, which will be referred to as a BS-based data rate determination scheme. In another embodiment, the RS determines a data transmission rate, which will be referred to as an RS-based data rate determination scheme. In the BS-based data rate determination scheme, the BS determines a data transmission rate using the feedback information (the queue length information and the channel condition information for each MS) received from the RS. The use of the BS-based data rate determination scheme can simplify the RS. In the RS-based data rate determination scheme, the RS calculates a BS-RS data transmission rate of the next frame using its queue length information and the channel condition information of MSs and reports the calculated BS-RS data transmission rate to the BS. The use of the RS-based data rate determination scheme increases the complexity of the RS, but can reduce the control information exchanged between the BS and the RS because the RS calculates the data transmission rate beforehand using the channel condition information.

The BS-RS data transmission rate according to the present invention can be determined using Equation (1):

$$r_i[t+\Delta t]=r_i[t]-A(q_i[t]-q_i[t-\Delta t-])-B\Delta t(q_i[t]-q_{Ti}-\Delta C_i) \quad (1)$$

where $r_i[t]$ is a BS-RS data transmission rate (bit/sec) for the $i^{th}$ MS at a time point t, $q_i[t]$ is the RS queue length (bit) for the $i^{th}$ MS at the time point t, $q_{Ti}$ is the target queue length (bit) for the $i^{th}$ MS, $\Delta t$ is the update period (sec) of the data transmission rate, $\Delta C_i$ is the channel capacity change (bit) versus the previous frame between the RS and the $i^{th}$ MS, and A and B (A,B>0) are parameters for adjusting the change of the data transmission rate (A: 1 sec$^{-1}$; B: 1 sec$^{-2}$).

As seen from Equation (1), when the current RS queue length increases above the RS queue length for the previous frame ($q_i[t]-q_i[t-\Delta t]>0$) or is larger than the target RS queue length ($q_i[t]-q_{Ti}>0$) and the RS-MS channel condition is degraded from that for the previous frame ($\Delta C_i<0$), a BS-RS data transmission rate is reduced. However, when the current RS queue length decreases below the RS queue length for the previous frame ($q_i[t]-q_i[t-\Delta t]<0$) or is smaller than the target RS queue length ($q_i[t]-q_{Ti}<0$) and the RS-MS channel condition is upgraded from that for the previous frame ($\Delta C_i>0$), a BS-RS data transmission rate is increased. Therefore, when the parameters A and B in Equation (1) are set to be optimal, the queue length for the $i^{th}$ MS can be converged on the target queue length.

If the $\Delta t$ is the time of one frame, the $q_i[t]$ is a queue length for the current frame and $q_i[t-\Delta t]$ is a queue length for the previous frame. Therefore, $(q_i[t]-q_i[t-\Delta t])$ denotes a change in a queue length for one frame. The $q_{Ti}$ denotes the suitable amount of data that is buffered to provide a service from the RS to the $i^{th}$ MS. Therefore, $(q_i[t]-q_{Ti})$ denotes a difference between the current queue length and the target queue length.

If the $C_i[t]$ is the channel capacity at the time point $t(C_i=BW \log_2(1_{SINR_i})$ bit/sec), the $\Delta C_i$ is $(C_i[t-\Delta t]-C_i[t]\times\Delta t)$ which denotes a change in the amount (the number of bits) of data that can be serviced from the RS to the MS for one frame on the basis of the MS channel condition.

The parameters A and B must be optimized in order to rapidly converge a queue length on the target queue length.

The discrete-time Equation (1) can be transformed into a continuous-time equation expressed as Equation (2):

$$r_i'[t]=-Aq_i'[t]-Bq_i[t]+B(q_{Ti}+\Delta C_i) \quad (2)$$

The queue length change of the RS equals a difference between the amount $r_i[t]\Delta t$ of data transmitted from the BS and the amount $C_i[t]\Delta t$ of data transmitted from the RS to the MS and thus can be expressed as Equation (3):

$$q_i'[t]=r_i[t]-C_i \quad (3)$$

The use of Equation (2) and Equation (3) can determine the values of the parameters A and B that make it possible to rapidly converge the queue length on the target queue length while satisfying the stability. However, because the RS-MS channel capacity $C_i$, the channel capacity change $\Delta C_i$ and the target queue length $q_{Ti}$ are not constant but random parameters, the parameters A and B providing the optimal convergence rate are searched while changing $C_i$ and $(q_{Ti}+\Delta C_i)$ within the possible range of the corresponding system. Then, the BS stores the searched parameters A and B in the form of a lookup table.

Meanwhile, the $q_{Ti}$ is the parameter denoting the target queue length for the $i^{th}$ MS, and Equation (1) controls the queue length for the $i^{th}$ MS to converge on the target queue length. The $q_{Ti}$ denotes the amount of data that is pre-stored for the $i^{th}$ MS by the RS, and data to be transmitted from the RS to the MS for the next frame is not insufficient when the $q_{Ti}$ value is greater than the amount of data to be serviced for the next frame. However, when the $q_{Ti}$ value is too large, the same problem occurs as in the conventional scheme in which all data is forwarded to the RS. It is impossible to accurately predict the amount of data to be transmitted for the next frame or the link capacity of a radio channel for determination of the optimized $q_{Ti}$ value.

Therefore, the embodiment of the present invention sets the $q_{Ti}$ value using the long-term average of the RS-MS link capacity, as expressed in Equation (4):

$$q_{Ti}=E[C_i(t)]\times T \quad (4)$$

where T is the frame length.

In Equation (4), because $C_i[t](C_i=BW \log_2(1_{SINR_i})$ bit/sec) is the channel capacity between the RS and the $i^{th}$ MS, $E[C_i(t)]$ is the average channel capacity between the RS and the $i^{th}$ MS. Because the unit of $E[C_i(t)]$ is bit/sec, the average number of bits to be transmitted for one frame is calculated to be $E[C_i(t)]\times T$.

The above-described data rate control scheme can be similarly applied to a 3 or more-hop relay system.

Figure 4:
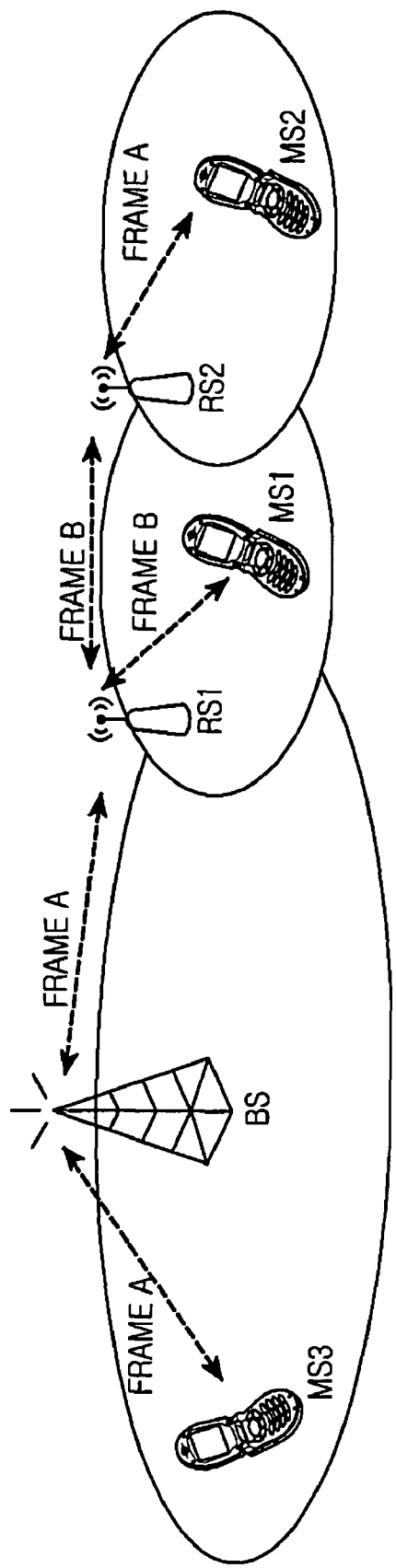
FIG. 4 illustrates a structure of a 3 or more-hop relay system.

FIG. 4 illustrates a structure of a 3 or more-hop relay system.

Referring to FIG. 4, a BS transmits data to an RS 1 using a frame A. Using a frame B, the RS1 relays a portion of the received data to an MS1, and the other portion of the received data to an RS2. Using a frame A, RS2 relays the received data to an MS2. The communication between the BS and the RS1 and the communication between the RS2 and the MS2 are performed simultaneously using the same frame A, while the communication between the RS1 and the RS2 is performed at a different time point using the frame B.

Figure 5:
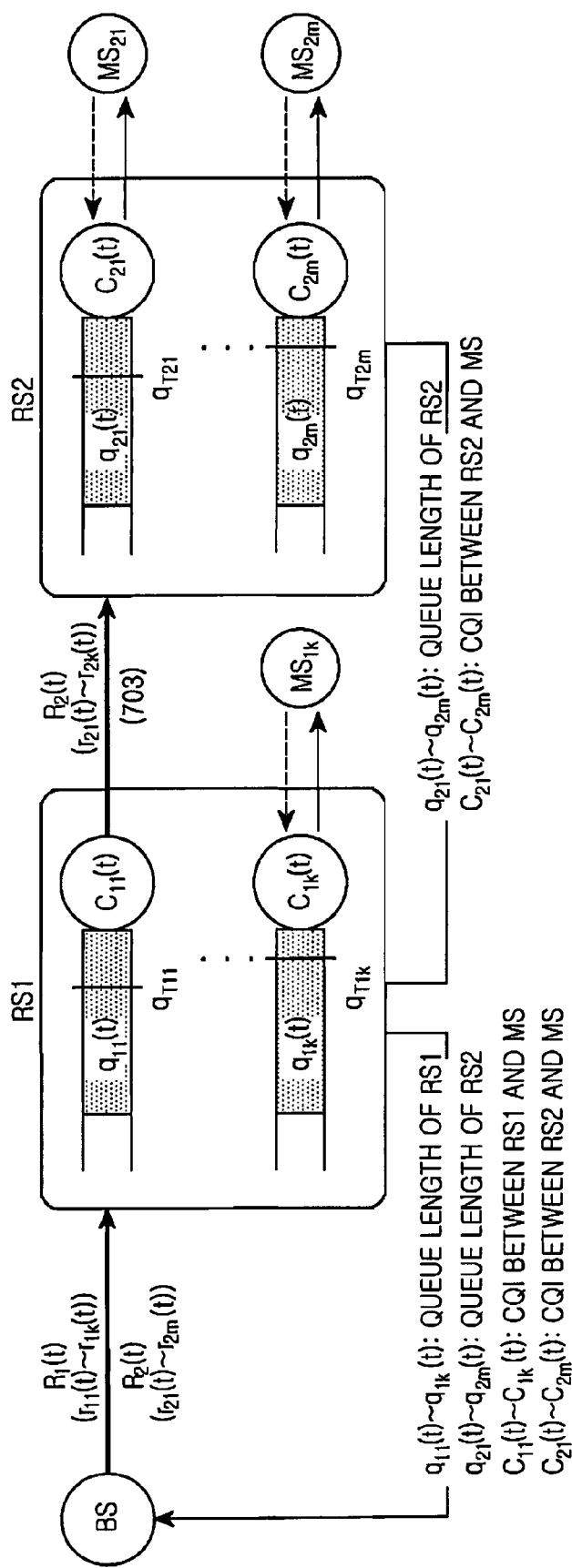
FIG. 5 illustrates a closed data rate control model for the 3 or more-hop relay system according to the present invention.

FIG. 5 illustrates a closed data rate control model for the 3 or more-hop relay system according to the present invention.

Parameters used in the model are defined as follows:
k: the number of MSs serviced by the RS1.
m: the number of MSs serviced by the RS2.
$r_{ij}(t)$: a data transmission rate for the $j^{th}$ MS serviced by the $i^{th}$ RS at a time point t.

$C_{ij}(t)$: the channel capacity or CQI information of the $j^{th}$ MS serviced by the $i^{th}$ RS at the time point t.

$q_{ij}(t)$: the queue length for the $j^{th}$ MS serviced by the $i^{th}$ RS at the time point t.

$q_{Tij}$: the target queue length for the $j^{th}$ MS serviced by the $i^{th}$ RS.

$R_1(t)$: the transmission rate $$\left(\sum_{j=1}^{k} r_{1j}\right)$$

of data transmitted from the BS to the MSs serviced by the RS1.

$R_2(t)$: the transmission rate $$\left(\sum_{j=1}^{k} r_{2j}\right)$$

of data transmitted from the BS to the MSs serviced by the RS2.

Referring to FIG. 5, the BS transmits data for MSs, serviced by the RS1 and the RS2, to the RS 1, and the RS 1 relays data for MSs, serviced by the RS2, to the RS2. At this point, the total transmission rate of data transmitted from the BS to the RS1 is $(R_1(t)+R_2(t))$ where $R_2(t)$ denotes the transmission rate of data transmitted from the RS1 to the RS2.

First, the RS2 reports the queue length information ($q_{21}(t)\sim q_{2m}(t)$) and channel condition information ($C_{21}(t)\sim C_{2m}(t)$) of m mobile stations $MS_{21}\sim MS_{2m}$ in its service coverage to RS1, and RS1 transmits the information received from RS2 and the queue length information ($q_{11}(t)\sim q_{1k}(t)$) and channel condition information ($C_{11}(t)\sim C_{1k}(t)$) of k mobile stations $MS_{11}\sim MS_{1k}$ in its service coverage to the BS.

Then, the BS determines a BS-RS1 data transmission rate $R_1(t)$ and an RS1-RS2 data transmission rate $R_2(t)$ using Equation (1). Thereafter, the BS transmits data to RS1 at a data transmission rate of $(R_1(t)+R_2(t))$, and the RS1 transmits data to the RS2 at a data transmission rate of $R_2(t)$. Then, RS2 relays the data received from the RS1 to the corresponding MSs.

As described above, the 3 or more-hop relay system also uses Equation (1) to calculate the data transmission rate for each hop. Therefore, the following description will be given assuming that the multi-hop relay system is the 2-hop relay system.

Figure 6:
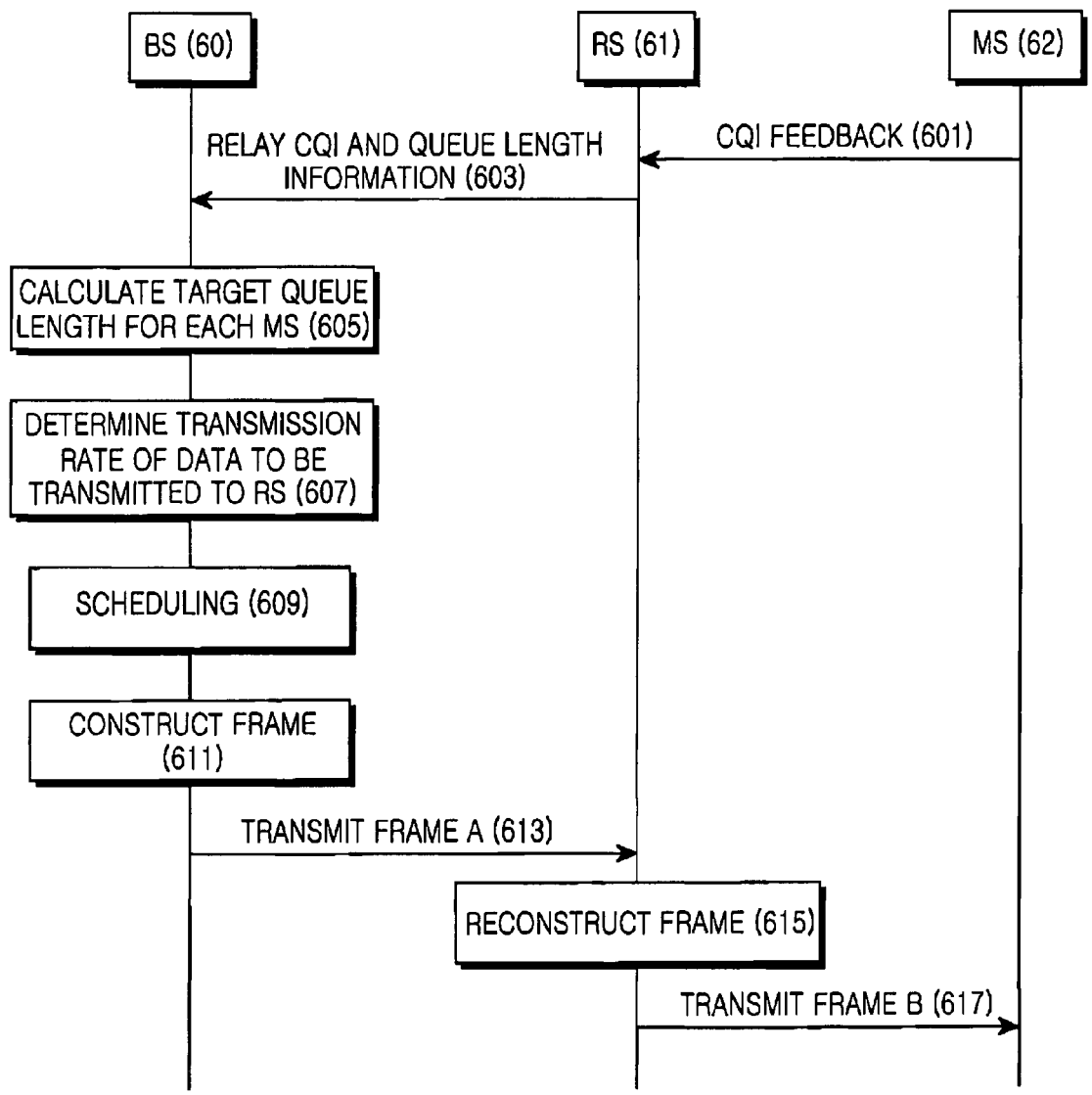
FIG. 6 illustrates a procedure for determining a data transmission rate in a multi-hop relay system according to the present invention.

FIG. 6 illustrates a procedure for determining a data transmission rate in the multi-hop relay system according to the present invention.

Referring to FIG. 6, in step 601, an MS 62 measures channel conditions using a downlink pilot signal and feeds the measured channel condition information (CQI information) back to an RS 61. In step 603, RS 61 relays, to a BS 60, the fed-back channel condition information and information about the length of a queue for buffering data to be transmitted to MS 62. For example, when the RS queue length for the $i^{th}$ MS is 10 bytes and the minimum unit is 1 byte, the RS 61 reports that the RS queue length for the $i^{th}$ MS is 10.

In step 605, BS 60 detects a channel capacity using the channel condition information received from RS 61, and calculates the target queue length for MS 62 using Equation (4). In step 607 using Equation (1), BS 60 calculates a transmission rate of data for MS 62 to be transmitted to the RS 61.

When the data transmission rate between BS 60 and RS 61 is calculated using Equation (1), because RS 61 can store data for MS 62 by the target queue length, RS 61 can stably buffer data to be transmitted for the next frame and a jitter caused by a rapid change in the queue length can be removed. In addition, because BS 60 transmits data to RS 61 by the target queue length, an unnecessary resource waste between BS 60 and RS 61 can be reduced and the amount of data, which must be discarded by RS 61 when MS 62 is handed over to another RS, can be minimized.

In step 609, BS 60 performs a resource scheduling operation using a BS-RS data transmission rate for each RS and the channel condition information fed back from each MS. Specifically, according to the above data transmission rate, BS 60 determines a BS-RS MCS level and performs resource allocation (or channel allocation). In addition, on the basis of the channel condition information fed back from the MS, BS 60 determines an RS-MS MCS level and performs resource allocation.

In step 611, according to the scheduling result, BS 60 constructs a frame of data to be transmitted. In step 613, BS 60 transmits the constructed frame (frame A) to RS 61. In step 615, RS 61 reconstructs the frame received from BS 60. In step 617, RS 61 transmits the reconstructed frame (frame B) to MS 62.

Figure 7:
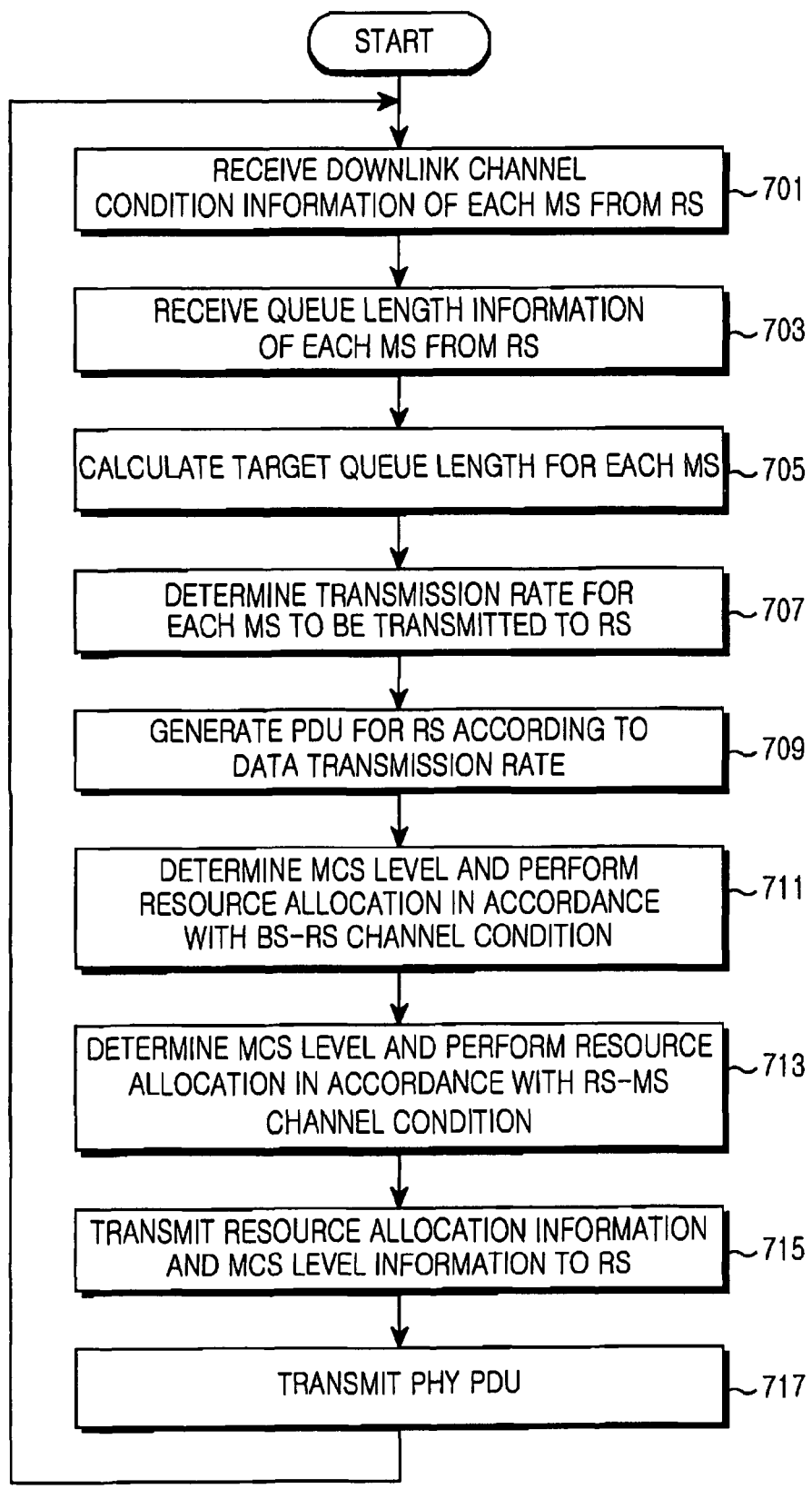
FIG. 7 illustrates an operation of a BS in the multi-hop relay system according to the present invention.

FIG. 7 illustrates an operation of the BS 60 in the multi-hop relay system according to the present invention.

Referring to FIG. 7, the BS 60 receives the downlink channel condition information of each of MSs, serviced by RS 61, from RS 61 in step 701. In step 703, the BS 60 receives the queue length information of each of the MSs from the RS 61. Alternatively, the channel condition information and the queue length information of the MSs may be simultaneously transmitted to BS 60.

In step 705, on the basis of the received channel condition information, BS 60 calculates the target queue length for each MS using Equation (4). In step 707, using Equation (1), BS 60 determines a transmission rate of data for each MS to be transmitted to RS 61.

In step 709, BS 60 generates data, which is to be transmitted to the MSs, in the format of MAC PDUs (Media Access Control Packet Data Units). In step 711, according to the determined data transmission rate, BS 60 determines a BS-RS MCS level and performs resource allocation (or channel allocation). In step 713, on the basis of the channel condition information fed back from the MSs, BS 60 determines an RS-MS MCS level and performs resource allocation.

In step 715, BS 60 transmits the resource allocation information and the MCS level information to RS 61 over a control channel (e.g., a MAP channel). In step 717, BS 60 reconstructs the generated MAC PDUs in the format of actually transmittable PHY PDUs (e.g., data bursts) and transmits the PHY PDUs to RS 61 over a traffic channel. The control channel and the traffic channel may be constructed in one frame.

Figure 8:
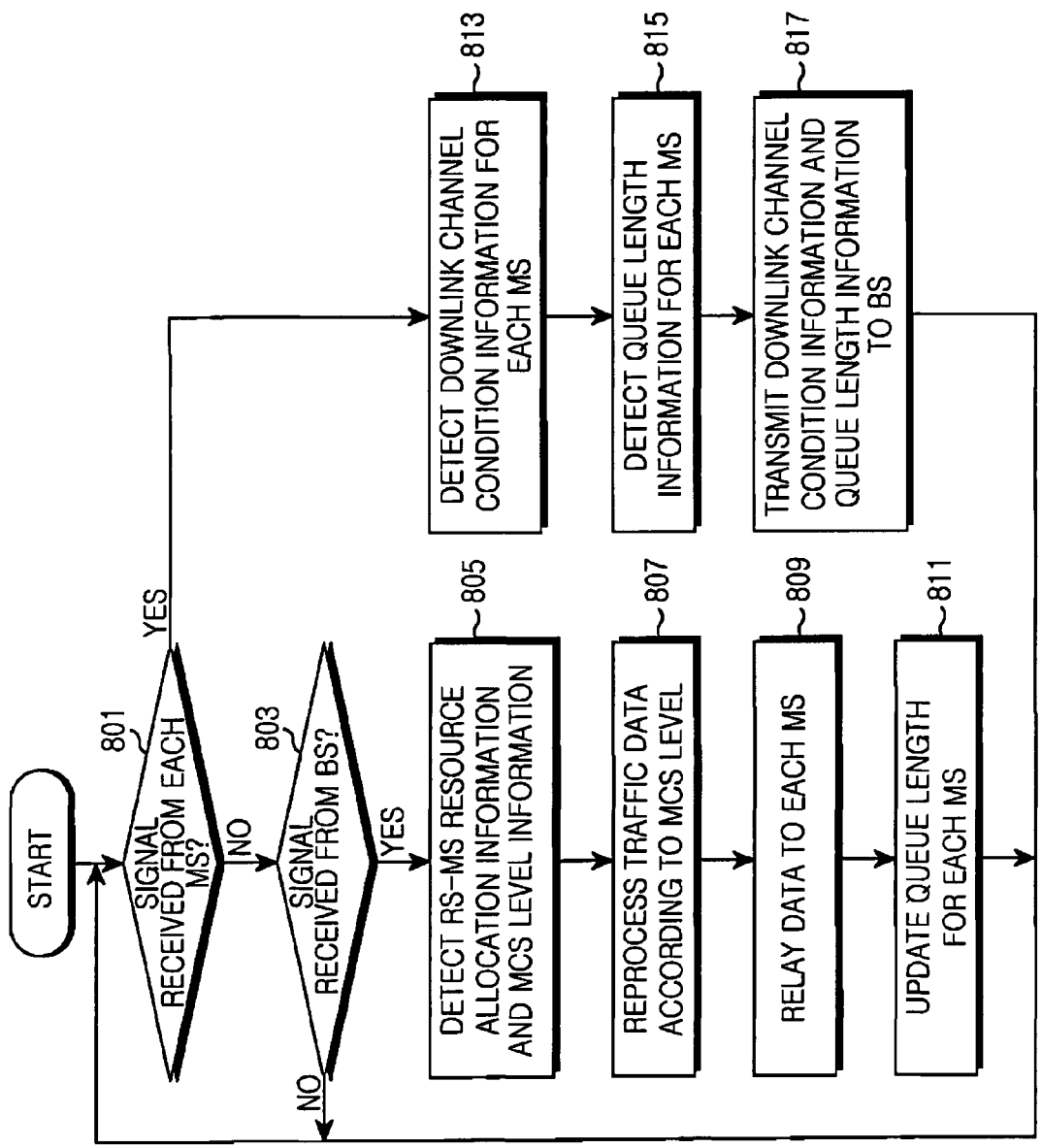
FIG. 8 illustrates an operation of an RS in the multi-hop relay system according to the present invention.

FIG. 8 illustrates an operation of RS 61 in the multi-hop relay system according to the present invention.

Referring to FIG. 8, RS 61 determines in step 801 whether a signal is received from each of MSs. If so, the operation proceeds to step 813; and if not, the operation proceeds to step 803.

In step 813, RS 61 analyzes the received signal to detect downlink channel condition information fed back from each MS. In step 815, RS 61 detects the current queue length information for each MS. In step 817, RS 61 transmits the downlink channel condition information and the queue length information for each RS to BS 60. Thereafter, the operation returns to step 801.

In step 803, the RS 61 determines whether a signal is received from BS 60. If so, the operation proceeds to step 805, and if not, the operation returns to step 801.

In step 805, RS 61 analyzes the received signal to detect the resource allocation information and the MCS level information between RS 61 and each MS.

In step 807, RS 61 reprocesses traffic data received from BS 60 according to the detected MCS level information and maps the resulting data to a corresponding resource according to the detected resource allocation information to generate a corresponding frame (frame B). In step 809, RS 61 relays the generated frame to each MS. In step 811, RS 61 updates the queue length for each MS. Thereafter, the operation returns to step 801.

Figure 9:
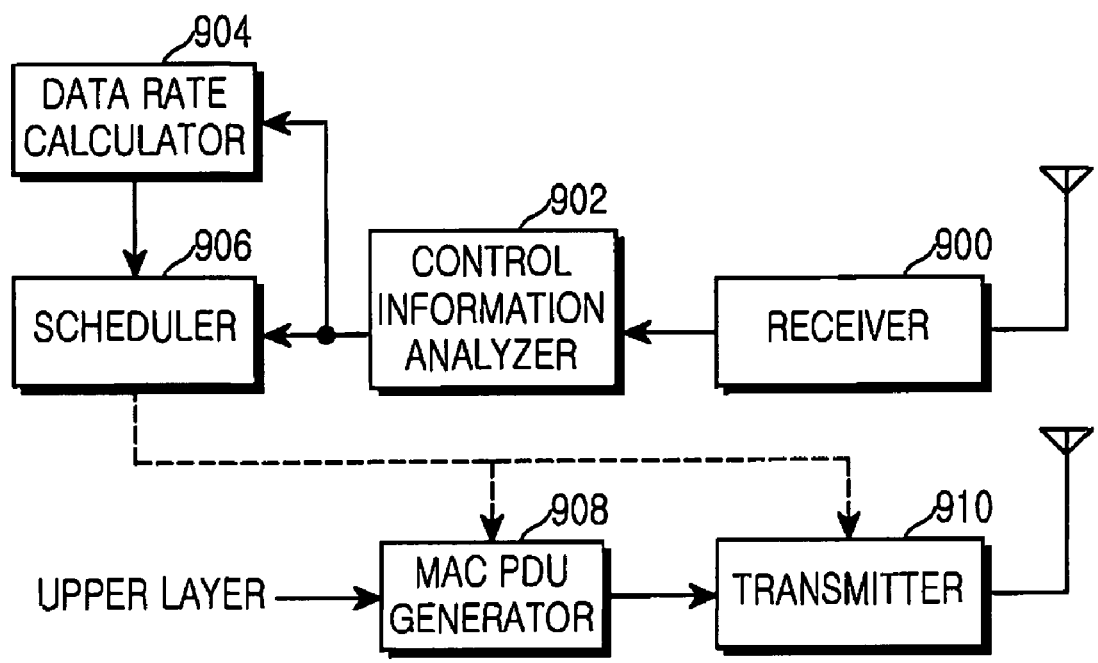
FIG. 9 is a block diagram of the BS in the multi-hop relay system according to the present invention.

FIG. 9 is a block diagram of the BS in the multi-hop relay system according to the present invention.

Referring to FIG. 9, in order to determine the data transmission rate using the channel condition information and the queue length information received from the RS, the BS includes a receiver 900, a control information analyzer 902, a data rate calculator 904, a scheduler 906, a MAC PDU generator 908 and a transmitter 910. Although FIG. 9 illustrates two separate antennas as TX/RX antennas, transmission and reception in a TDD system can be performed using only one antenna.

The receiver 900 demodulates a signal received through a Receive (RX) antenna at a predetermined scheme and outputs the resulting information data to the control information analyzer 902. In an Orthogonal Frequency Division Multiple Access (OFDMA) system, the receiver 900 is a physical layer that converts a signal received through an antenna into a baseband signal, OFDMA-demodulates the baseband signal, and demodulates and decodes the OFDMA-demodulated data at a predetermined MCS level to restore the original information data.

The control information analyzer 902 analyzes control information in the information data and, when the received signal is from the RS, extracts queue length information and channel condition information from the control information, and provides the queue length information and the channel condition information to the data rate calculator 904 and the scheduler 906.

The data rate calculator 904 calculates a channel capacity for each of MSs using the channel condition information, and averages the channel capacities for a predetermined window from the past to the present to calculate the target queue length. Using the channel condition information, the queue length information, and the target queue length, the data rate calculator 904 calculates a BS-RS data transmission rate according to Equation (1). The calculated data transmission rates are provided to the scheduler 906.

Using the data transmission rates from the data rate calculator 904 and the information (MS uplink channel condition information) from the RS, the scheduler 906 performs resource scheduling to determine resources and MCS levels that will be used for BS-RS and RS-MS communication. The scheduler 906 controls the MAC PDU generator 908 and the transmitter 910 according to the scheduling results.

The MAC PDU generator 908 generates data destined for MSs in the format of MAC PDU, arranges the generated MAC PDUs under the control of the scheduler 906 and provides the arranged MAC PDUs to the transmitter 910. The transmitter 910 encodes and modulates data received from the MAC PDU generator 908 at a predetermined MCS level, performs OFDMA modulation to map the resulting data to the determined resources (channels), and transmits the OFDMA-modulated data to the RS.

Figure 10:
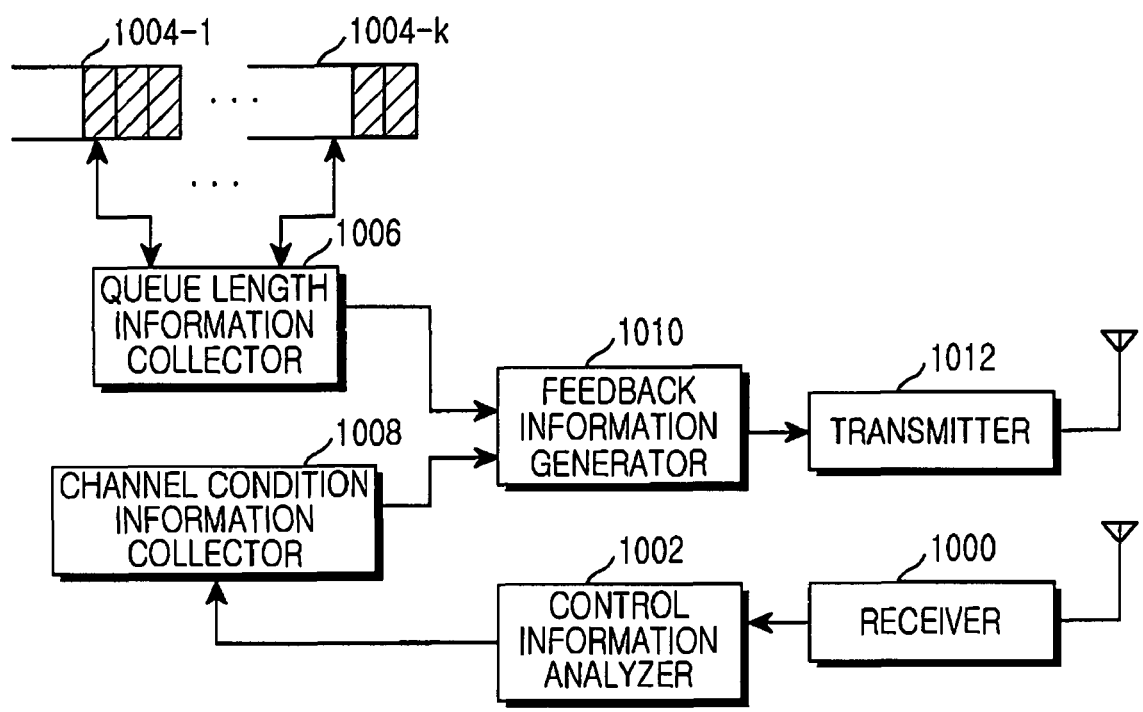
FIG. 10 is a block diagram of the RS in the multi-hop relay system according to the present invention.

FIG. 10 is a block diagram of the RS in the multi-hop relay system according to the present invention.

Referring to FIG. 10, in order to report channel condition information and queue length information to the RS, the RS includes a receiver 1000, a control information analyzer 1002, a plurality of queues 1004-1 through 1004-$k$, a queue length information collector 1006, a channel condition information collector 1008, a feedback information generator 1010 and a transmitter 1012.

The receiver 1000 demodulates a signal received through an RX antenna at a predetermined scheme and outputs the resulting information data to the control information analyzer 1002. In an OFDMA system, the receiver 1000 converts a signal received through an antenna into a baseband signal, OFDMA-demodulates the baseband signal, and demodulates and decodes the OFDMA-demodulated data at a predetermined MCS level to restore the original information data.

The control information analyzer 1002 analyzes control information in the information data and, when the received signal is a signal received from an RS, extracts channel condition information from the control information, and provides the channel condition information to the channel condition information collector 1008. The channel condition information collector 1008 collects MS uplink channel condition information from the control information analyzer 1002 and provides the extracted MS uplink channel condition information to the feedback information generator 1010.

The queues 1004-1 through 1004-$k$ buffer downlink data to be transmitted to the corresponding MSs. That is, the RS stores MS data received from the BS in the queues 1004-1 through 1004-$k$, and reads the MS data from the queues 1004-1 through 1004-$k$ to transmit the read MS data to the corresponding MSs.

The queue length information collector 1006 accesses the queues 1004-1 through 1004-$k$ at a predetermined period to detect (or update) a data load amount (queue length), and collects the queue length information to provide the same to the feedback information generator 1010.

Using the queue length information received from the queue length information collector 1006 and the channel condition information received from the channel condition information collector 1008, the feedback information generator 1010 generates feedback information (or control information) to provide the same to the transmitter 1012. The transmitter 1012 encodes and modulates data received from the feedback information generator 1010 at a predetermined MCS level, performs OFDMA modulation to map the resulting data to the determined resources (channels) and transmits the OFDMA-modulated data to the BS.

For example, it will be assumed that the BS already knows the following information.

the long-term average of MS uplink channel capacity: 10 bit/sec the channel bandwidth of an MS: 10 Hz the BS-RS data transmission rate for the current frame: 2 bit/sec the queue length for the previous fame: 5 bits the MS SINR (Signal-to-Interference plus Noise Ratio) value for the previous frame: 3 dB the frame length: 1 sec the optimized value of the parameter A in Equation (1): 1 $\sec^{-1}$ the optimized value of the parameter B in Equation (1): 1 $\sec^{-2}$ Under the above conditions, the BS-RS data transmission rate for the next frame is determined as follows: An MS feeds channel condition information (CQI information) back to the RS. An example of the channel condition information is 1-bit data (1 or 0) indicating a 1-dB increase or decrease in an SINR. It will be assumed that data '1' indicating a 1-dB increase in the SINR is fed back to the RS. Then, the RS transmits the channel condition information (CQI=1) fed back from the MS and the queue length information (u bits) for the MS to the BS. The channel condition information and the queue length information may be transmitted to the BS simultaneously or at different periods.

Thereafter, using the channel condition information received from the RS, the BS determines the target queue length of the MS according to Equation (4). The target queue length is the product of the frame length and the long-term average of the channel capacity of the MS, which denotes the amount of data that can be transmitted from the RS to the MS for one frame. Because the long-term average of the MS channel capacity is 10 bit/sec, the target queue length is $q_{Ti}=E[C_i(t)] \times 1=10 \times 1=10$ bit. In addition, because the SINR increases by 1 dB, the $\Delta C_i$ value is $(BW \times \log_2(1+4) - BW \times \log_2(1+3)) \times 1 \approx 3$.

Accordingly, the BS-RS data transmission rate for the next frame (t+TRIANGLEt) is calculated as Equation (5):

$$r_i[t+\Delta t] = r_i[t] - A(q_i[t] - q_i[t-\Delta t]) - B\Delta t(q_i[t] - q_{Ti} - \Delta C_i) \quad (5)$$
$$= 2(\text{bit/sec}) - 1(\text{sec}^{-1}) \times (7-5)(\text{bit}) - 1(\text{sec}^{-2}) \times$$
$$1(\text{sec}) \times (7-10-3)(\text{bit})$$
$$= (2-2+6)(\text{bit/sec}) = 6 \text{ bit/sec}$$

According to the calculated BS-RS data transmission rate, the BS determines a BS-RS MCS level and performs resource allocation (or channel allocation). In addition, on the basis of the channel condition information fed back from the MS, the BS determines an RS-MS MCS level and performs resource allocation. The BS-RS MCS level and resource allocation information and the RS-MS MCS level and resource allocation information are transmitted to the RS over a control channel (e.g., MAP), while traffic data destined for the MS is processed and transmitted to the RS according to the BS-RS MCS level and channel allocation information. According to the BS-MS MCS level and channel allocation information received over a control channel, the RS again processes the traffic data received from the BS to relay the resulting data to the MS.

As described above, according to the present invention, the RS stably buffers the data to be transmitted for the next frame in the multi-hop relay system. That is, a jitter due to a change in the queue length of the RS is reduced. In addition, because the queue length of the RS is converged on the target value, a waste of the BS-RS resources and the memory capacity for the RS are reduced. Also, because the target queue length is set for each MS, the monopolization of the RS memory by an MS is prevented.

While the invention has been shown and described with reference to certain preferred embodiments thereof, it will be understood by those skilled in the art that various changes in form and details may be made therein without departing from the spirit and scope of the invention as defined by the appended claims.

What is claimed is:

1. A Base Station (BS) apparatus in a multi-hop relay system, comprising:
    a receiver for receiving channel condition information and queue length information of a queue for buffering data to be relayed to a Mobile Station (MS) from a Relay Station (RS);
    a target queue length determiner for determining a target queue length for the MS using the channel condition information; and
    a data rate determiner for determining a data transmission rate between the BS and the RS for data of the MS using the target queue length, the channel condition information and the queue length information.

2. The BS apparatus of claim 1, further comprising a scheduler for performing a resource scheduling operation for communication between the BS and the RS using the data transmission rate received from the data rate determiner.

3. The BS apparatus of claim 1, wherein the channel condition information includes a Signal-to-Interference plus Noise Ratio (SINR).

4. The BS apparatus of claim 1, wherein the target queue length determiner calculates a channel capacity using the channel condition information and calculates the target queue length using a long-term average of the channel capacity.

5. The BS apparatus of claim 1, wherein the data rate determiner determines the data transmission rate such that a queue length of the RS for the MS is converged on the target queue length.

6. The BS apparatus of claim 1, wherein the data rate determiner reduces the data transmission rate when a queue length is greater than previous data transmission rate value or the target queue length, and increases the data transmission rate when the queue length is less than the previous data transmission rate or the target queue length.

7. The BS apparatus of claim 1, wherein the data rate determiner determines the data transmission rate using the following equation:

$$r_i[t+\Delta t] = r_i[t] - A(q_i[t] - q_i[t-\Delta t]) - B\Delta t(q_i[t] - q_{Ti} - \Delta C_i)$$

where $r_i[t]$ is a BS-RS data transmission rate (bit/sec) for an $i^{th}$ MS at a time point t, $q_i[t]$ is an RS queue length (bit) for the $i^{th}$ MS at the time point t, $q_{Ti}$ is the target queue length (bit) for the $i^{th}$ MS, $\Delta t$ is an update period (sec) of the data transmission rate, $\Delta C_i$ is a channel capacity change (bit) versus the previous frame between the RS and the $i^{th}$ MS, and A and B are parameters for adjusting a change of the data transmission rate (A: 1 sec$^{-1}$; B: 1 sec$^{-2}$).

8. A Relay Station (RS) apparatus in a multi-hop relay system, comprising:
    a channel condition information collector for collecting channel condition information fed back from Mobile Stations (MSs);
    a queue length information collector for collecting queue length information of queues for buffering data to be relayed to the MSs; and
    a feedback unit for feeding at least one of (1) the channel condition information from the channel condition information collector and the queue length information from the queue length information collector and (2) channel condition information and queue length information for MSs of a subordinate RS from the subordinate RS, back to a Base Station (BS).

9. A communication method for a Base Station (BS) in a multi-hop relay system, comprising the steps of:
- receiving channel condition information and queue length information of a queue for buffering data to be relayed to a Mobile Station (MS) from a Relay Station (RS);
- determining a target queue length for the MS using the channel condition information; and
- determining a data transmission rate between the BS and the RS for data of the MS using the target queue length, the channel condition information, and the queue length information.

10. The communication method of claim 9, further comprising performing a resource scheduling operation for communication between the BS and the RS using the data transmission rate.

11. The communication method of claim 9, wherein the channel condition information includes a Signal-to-Interference plus Noise Ratio (SINR).

12. The communication method of claim 9, wherein determining the target queue length further comprises:
- calculating a channel capacity using the channel condition information; and
- calculating the target queue length using a long-term average of the channel capacity.

13. The communication method of claim 9, wherein the data transmission rate is determined such that a queue length of the RS for the MS is converged on the target queue length.

14. The communication method of claim 9, wherein the determining of the data transmission rate further comprises:
- reducing the data transmission rate when a queue length is greater than previous data transmission rate value thereof or the target queue length; and
- increasing the data transmission rate when the queue length is less than the previous value thereof or the target queue length.

15. The communication method of claim 9, wherein the data transmission rate is determined using the following equation:

$$r_i[t+\Delta t] = r_i[t] - A(q_i[t] - q_i[t-\Delta t]) - B\Delta t(q_i[t] - q_{Ti} - \Delta C_i)$$

where $r_i[t]$ is a BS-RS data transmission rate (bit/sec) for an $i^{th}$ MS at a time point t, $q_i[t]$ is a RS queue length (bit) for the $i^{th}$ MS at the time point t, $q_{Ti}$ is the target queue length (bit) for the $i^{th}$ MS, $\Delta t$ is an update period (sec) of the data transmission rate, $\Delta C_i$ is a channel capacity change (bit) versus a previous frame between the RS and the $i^{th}$ MS, and A and B are parameters for adjusting a change of the data transmission rate (A: 1 sec$^{-1}$; B: 1 sec-$^{2}$).

16. A communication method for a Relay Station (RS) in a multi-hop relay system, comprising the steps of:
- collecting channel condition information fed back from Mobile Stations (MSs);
- collecting queue length information of queues for buffering data to be relayed to the MSs; and
- reporting the collected channel condition information and the collected queue length information to a Base Station (BS);
- receiving channel condition information and queue length information for MSs of a subordinate RS from the subordinate RS; and
- relaying the received channel condition information and the received queue length information for the MSs of the subordinate RS to the BS.

* * * * *